United States Patent Office 2,891,987
Patented June 23, 1959

2,891,987

α-AMINO-β-AMINOXYPROPIONIC ACID AND DERIVATIVES THEREOF

Robert Lawrence Peck, deceased, late of Plainfield, N.J., by Helen McLean Peck, administratrix, assignor to Merck & Co., Inc., a corporation of New Jersey No Drawing. Original application December 23, 1954, Serial No. 477,397. Divided and this application May 27, 1957, Serial No. 666,260

11 Claims. (Cl. 260—482)

This invention relates to derivatives of α-amino-propionic acid and to processes for preparing them. Particularly it relates to α-amino-β-aminoxy-propionic acid, derivatives and salts thereof, and to processes for preparing these compounds.

This application is a division of my copending application Serial No. 477,397, filed December 23, 1954, now abandoned.

The compounds which are the subject of the present invention have the following general formula:

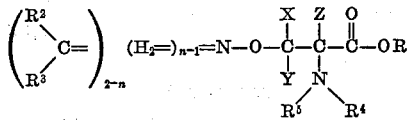

wherein $n$ is either 1 or 2, R is hydrogen, a metal group or an alkyl or aralkyl group having a chain length of from 1 to 10 carbon atoms, $R^2$ and $R^3$ are hydrogen or alkyl, aryl or aralkyl groups having a chain length of from 1 to 10 carbon atoms and may be the same or different groups, $R^4$ is hydrogen or an acyl group having a chain length of from 1 to 8 carbon atoms, $R^5$ is hydrogen, or an alkyl, aralkyl, aryl or acyl group having a chain length of from one to eight carbon atoms and X, Y, and Z are hydrogen or alkyl, aralkyl, aryl or acyl groups having a chain length of from one to eight carbon atoms and may be the same or different groups; and acid addition salts of such compounds.

The compounds of this invention may be prepared by the degradation of a 4-amino-3-isoxazolidone compound (Compound I) having the general formula—

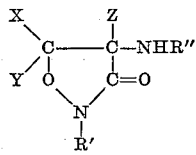

wherein X, Y, and Z are as defined above and R' and R" are hydrogen or alkyl, aralkyl, or aryl groups having a chain length of from one to eight carbon atoms and may be the same or different groups. The degradation is carried out by reacting the 4-amino-3-isoxazolidone compound with an acidic alcohol thereby forming an ester of α-amino-β-aminoxy-propionic acid (Compound II). These esters may be further reacted with carbonyl compounds to yield the corresponding oxime type compounds (Compound III). The oxime compound may then be reacted with organic acid anhydrides or acid halides to form the corresponding mono or di acylated derivatives (Compound IV). The mono or di acylated derivatives can be reacted with a mineral acid to form a compound having a free amino group (Compound V). All of the esters may be converted to the corresponding free acid or acid salt by treatment with basic substances and the acid addition salt may be formed by treating with an acid.

The reactions indicated hereinabove may be chemically represented, as an example, when X, Y, Z and R' are hydrogen and R", R, $R^2$, $R^3$, $R^4$ and $R^5$ are as defined above, as follows:

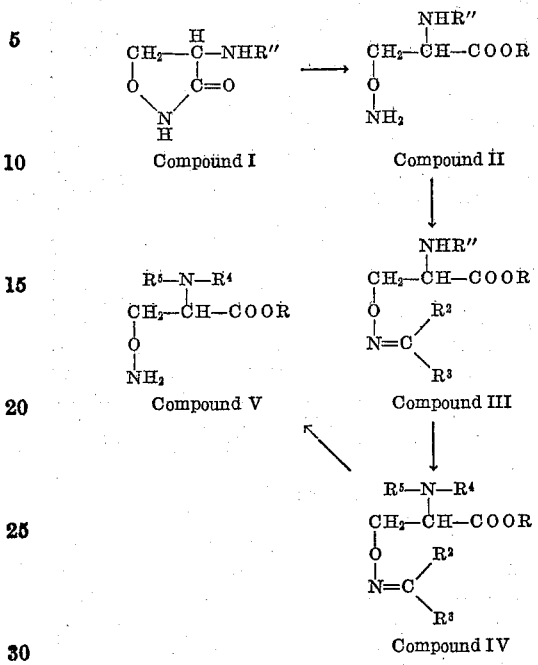

The degradation of the 4-amino-3-isoxazolidone compound may be carried out by dissolving the compound in an alkyl or aralkyl alcohol, as for example methyl alcohol, ethyl alcohol, propyl alcohol, butyl alcohol or benzyl alcohol. This solution is preferably heated at reflux temperature for several hours in the presence of an organic or inorganic acid. It is preferred to carry out the reaction in the presence of a non-oxidizing mineral acid such as hydrochloric, hydrobromic or sulfuric since the product is then readily isolated as the crystalline acid addition salt. The amount of acid used is not critical but it is preferred to use an excess over that which would be required to form the acid addition salt. The temperature at which the reaction is carried out is also not critical, but the reaction time is inversely proportional to the temperature. The esters produced may be recovered by extraction followed by purification if desired as for example by washing with a non-solvent. If the reaction is carried out in the presence of a mineral acid, the acid addition salt formed may readily be neutralized to obtain the corresponding free base.

The oxime type compounds which have the general formula—

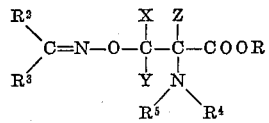

wherein R, $R^2$, $R^3$, $R^4$, $R^5$, X, Y, and Z are as defined above may be prepared from the esters of α-amino-β-aminoxy-propionic acid by reacting with carbonyl compounds such as aldehydes or ketones. Such carbonyl compounds are for example, acetaldehyde, benzaldehyde, acetone, methyl ethyl ketone, methyl phenyl ketone, and diethyl ketone. The reaction is preferably carried out in solution and therefore if the ester is not soluble in the carbonyl compound a solvent for the ester such as one of the lower alcohols, or the like may be added. The rate of the reaction is increased by the presence of an acid and it is preferred to use non-oxidizing mineral acids such as hydrochloric or sulfuric, thereby forming the acid additional salt of the product. The reaction proceeds rapidly and may be carried out at moderate temperatures. The product may be recovered by precipitating it from the reaction mixture by the addition of a nonsolvent such as, for example, an ether. The acid addition salts may be neutralized to form the free base.

The aldehyde and ketone addition products of the α-amino-β-aminoxy-propionates readily react with common acylating agents. For example, organic acid anhydrides and acyl halides such as acetic anhydride, benzoic anhydride, acetyl chloride, valeryl chloride, and benzoyl chloride to form the corresponding acylated derivatives. The reaction is very rapid and may be carried out at room temperature by dissolving the reactants in a suitable solvent such as pyridine. The products may be separated from the reaction mixture by evaporation followed by dilution with water.

The acylated aldehyde and ketone addition products of the α-amino-β-aminoxy-propionates are reacted with a mineral acid to form the corresponding acylated α-amino-β-aminoxy-propionates. Any mineral acid can be used but it is preferred to use sulfuric, hydrochloric or hydrobromic acid. The reaction proceeds most favorably at temperatures below 50° C. with about room temperature (20–30° C.) being the most desirable. The reaction can be carried out in an organic solvent if desired. The products can be recovered from the reaction mixture by the addition of a non-solvent such as ether.

Compounds III and V may be saponified by carefully treating with a mild base, such as an alkali metal hydroxide, to form the metal salts as for example, the sodium, potassium or barium salts. These salts are then subjected to acidic conditions to form the corresponding acid. This treatment with a mild base should be carefully controlled to prevent cyclization of the compound.

The following examples are given for purposes of illustration:

*Example 1*

Twenty grams of substantially pure 4-amino-3-isoxazolidone were dissolved in 400 milliliters of methanol containing 49 grams of hydrogen chloride. The solution was held at reflux temperature for about five hours, then cooled to about 25° C. Addition of 450 ml. of diethyl ether (one volume) caused separation of rosettes or needles. After about ten minutes, the crystals were collected by filtration, washed with several small portions of a mixture of equal volume of methanol and ether and finally with ether alone and then dried in vacuo, and the yield was 29.5 g. of substantially pure crystalline methyl-α-amino-β-aminoxy-propionate dihydrochloride which showed $[\alpha]_D^{25}$ —12 (C., 2.5 in water, and —9° (C., 3.2 in normal hydrochloric acid). The crystals melted over the range 145–155° C. with decomposition.

*Example 2*

Five grams of substantially pure 4-amino-3-isoxazolidone was dissolved in 350 ml. of ethanol containing 13 g. of hydrogen chloride. The solution was held at reflux temperature for about five hours, then cooled and filtered to remove a trace of insoluble material. The filtrate was diluted with 300 ml. of ether which caused separation of crystals. The crystals were collected by filtration, washed with an ethanol-ether mixture and with ether alone and then dried. A second crop of crystals was obtained from the mother liquors by addition of more ether. The total yield was 9.91 g. The crystals of substantially pure ethyl-α-amino-β-aminoxy-propionate dihydrochloride thus obtained melted at 145–153° C. The acid salt was readily converted to the free base by neutralizing the salt.

*Example 3*

Two grams of the dihydrochloride product obtained in Example 1 was dissolved in 10 ml. of methanol and mixed with 25 ml. of acetone. The mixture was then warmed for ten minutes on a steam bath. On the addition of 200 ml. of ether to the mixture, long needles separated from the solution. The yield was 1.62 g. of substantially pure crystalline methyl-α-amino-β-isopropylidineaminoxy-propionate hydrochloride melting at 173–174° C. with preliminary transition to finer needles below the melting point. The acid salt was readily converted to the free base by carefully neutralizing a solution of the salt.

*Example 4*

A mixture of 0.5 g. of the product of Example 3 with 2.5 ml. of pyridine and 4.0 ml. of acetic anhydride formed a solution. The solution was allowed to stand at room temperature for one hour and then evaporated to a syrupy residue. The residue of crude material was dissolved in chloroform and extracted with water. The chloroform solution was dried and evaporated to dryness leaving a glassy residue of methyl-α-acetamido-β-isopropylidineaminoxy-propionate.

*Example 5*

A solution of 400 mg. of methyl-α-amino-β-isopropylidineaminoxy-propionate hydrochloride in 3 ml. of pyridine was mixed with 0.4 ml. of benzoyl chloride in an ice bath. After standing in the ice bath (0–5° C.) for thirty minutes and at room temperature for one hour, the mixture was taken up in chloroform and washed with water. The chloroform solution was evaporated to give an oily residue which crystallized to a low-melting mass of needles on standing. (Yield was 630 mg.) The product was a mixture of the α-benzamido and α-dibenzamido derivative of the methyl ester of β-isopropylidine-aminoxy-propionic acid hydrochloride.

*Example 6*

A 580 mg. sample of the mono-benzamido product of Example 5 was dissolved in 5 ml. of 0.3 N barium hydroxide solution and shaken occasionally at room temperature for three hours. The mixture was then filtered. The filtrate as acidified and extracted with chloroform. The chloroform extract was evaporated to give a colorless oil. This oil was caused to crystallize from ether to give rosettes of crystals which melted at 131–134° C. The product corresponds to the formula—

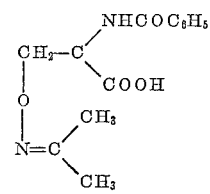

*Example 7*

The α-amino-β-aminoxy-propionic acids and their derivatives may be hydrogenated to the corresponding derivatives of D-serine. These latter compounds are valuable intermediates in the synthesis of other amino acids such as cystine and cysteine according to well-known procedures. The hydrogenation of these compounds may be carried out by dissolving the reactants in a suitable solvent and then subjecting the mixture to the action of hydrogen in the presence of a hydrogenation catalyst. This reaction may be illustrated as follows:

*Example 8*

One gram of the dihydrochloride product obtained in Example 1 was dissolved in 100 ml. of methanol and hydrogenated in the presence of a platinum catalyst. After completion of hydrogenolysis, the catalyst was removed by filtration, and the filtrate was evaporated to dryness. The residue was taken up in 120 ml. of absolute ethanol-ether mixture and filtered to remove ammonium chloride. The filtrate on dilution with 230 ml. of ether deposited 570 mg. of plate-crystals of D-serine methyl ester hydrochloride contaminated with a little ammonium chloride. The crystals melted at 158–161° C. (dec.) (micro-block) and were levorotatory in dilute hydrochloric acid solution. *Analysis.*—Calcd. for $C_4H_{10}NO_3Cl$: C, 30.88; H, 6.48; N, 9.00; Cl, 22.79; $OCH_3$, 19.95. Found: C, 29.87; H, 6.78; N, 10.34; Cl, 25.40; $OCH_3$, 18.24.

Any departure from the above description which conforms to the present invention is intended to be included within the scope of the claims.

What is claimed is:

1. Methyl-α-amino-β-isopropylidineaminoxy-propionate.
2. The dihydrochloride salt of methyl-α-amino-β-isopropylidineaminoxy-propionate.
3. Methyl-α-acetamido-β-isopropylidineaminoxy-propionate.
4. Methyl-α-benzamido-β-isopropylidineaminoxy-propionate.
5. Methyl-α-(dibenzoyl-amino)-β-isopropylidineaminoxy-propionate.
6. α-Benzamido-β-isopropylidineaminoxy-propionic acid.
7. The process which comprises reacting methyl-α-amino-β-aminoxy-propionate with acetone to produce methyl-α-amino-β-isopropylidineaminoxy-propionate.
8. The process which comprises reacting methyl-α-amino-β-isopropylidine-aminoxy-propionate with acetic anhydride to produce methyl-α-acetamido-β-isopropylidineaminoxy-propionate.
9. The process which comprises acylating methyl-α-amino-β-isopropylidineaminoxy-propionate by reacting with benzoyl chloride.
10. The process which comprises treating methyl-α-benzamido-β-isopropylidineaminoxy-propionate with barium hydroxide to produce α-benzamido-β-isopropylidineaminoxy-propionic acid.
11. The process which comprises reacting 4-amino-3-isoxazolidone with methyl alcohol to produce methyl-α-amino-β-aminoxy-propionate, reacting this latter compound with acetone to form methyl-α-amino-β-isopropylidineaminoxy-propionate and then heating the compound with acetic anhydride to produce methyl-α-acetamido-β-isopropylidineaminoxy-propionate.

No references cited.